United States Patent [19]

Villavicencio

[11] 4,199,399
[45] Apr. 22, 1980

[54] METHOD FOR PREPARING BAGASSE DISSOLVING PULPS AND PRODUCING RAYON HAVING A DEGREE OF POLYMERIZATION OF AT LEAST 800 THEREFROM

[75] Inventor: Eduardo J. Villavicencio, San Angel, Mexico

[73] Assignee: Process Evaluation & Development Corp., Dallas, Tex.

[21] Appl. No.: 954,668

[22] Filed: Oct. 25, 1978

Related U.S. Application Data

[63] Continuation-in-part of Ser. No. 678,297, Apr. 19, 1976, abandoned.

[51] Int. Cl.$^2$ .............................................. D01C 1/00
[52] U.S. Cl. ....................................... 162/85; 162/96; 162/86
[58] Field of Search ...................... 162/96, 89, 88, 84, 162/85, 86, 90

[56] References Cited

U.S. PATENT DOCUMENTS

| | | | |
|---|---|---|---|
| 2,166,330 | 7/1939 | Vincent | 162/89 |
| 2,731,345 | 1/1956 | Jen | 162/96 |
| 2,882,965 | 4/1959 | Wayman et al. | 162/89 |
| 2,924,547 | 2/1960 | Knapp et al. | 162/96 |
| 2,932,600 | 4/1960 | Powell | 162/96 |
| 3,051,611 | 8/1962 | Falcón et al. | 162/96 |
| 3,632,469 | 1/1972 | Wilder | 162/89 |
| 3,652,388 | 3/1972 | Croon et al. | 162/89 |
| 3,738,908 | 6/1973 | Villavicencio | 162/96 |
| 3,923,591 | 12/1975 | Villavicencio | 162/96 |

*Primary Examiner*—S. Leon Bashore
*Assistant Examiner*—Peter Chin
*Attorney, Agent, or Firm*—Michael J. McGreal

[57] ABSTRACT

A dissolving pulp suitable for preparing rayon having a degree of polymerization of greater than about 800 can be produced using bagasse by a sodium hydroxide-sodium sulfite digestion at a ph of about 10.5 to 11.5 and preferably about 10.8 to 11.2 and a caustic-sulfite weight ratio of 1:1 to 1:3 followed by a bleaching sequence of DcEDH or DcEDD. This results in a high purity low silica content fiber which has undergone very little degradation.

7 Claims, No Drawings

METHOD FOR PREPARING BAGASSE DISSOLVING PULPS AND PRODUCING RAYON HAVING A DEGREE OF POLYMERIZATION OF AT LEAST 800 THEREFROM

This application is a C-I-P of Ser. No. 678,297 filed Apr. 19, 1976, now abandoned.

This invention relates to a method for preparing a bagasse dissolving pulp suitable for producing rayon having a degree of polymerization greater than about 800. Further, this invention relates to producing rayon having a degree of polymerization of greater than 800 from a bagasse fiber source.

The usual sources of cellulose for the production of rayon are cotton or wood pulp. A prime reason for this resides in the need to produce rayon which has a high degree of polymerization. Degree of polymerization relates to the number of cellulose units in the cellulose chain of rayon. As the number of cellulose units increases, i.e., the degree of polymerization increases, the processability, capability for taking high stretch, flexural strength and tensile strength likewise increase. For instance, rayon tire cord is of the high tenacity type which must have a degree of polymerization of greater than 600 and a high uniformity in degree of polymerization. The cellulose unit length of the fibers must be uniformly greater than about 600 molecular units.

There has been a problem in utilizing bagasse as the fiber source for preparing dissolving pulps in that bagasse fiber before pulping has a cellulose unit chain lengths of principally about 800–1200. In contrast, softwood fiber before pulping has a cellulose unit chain length of principally about 1800–2000. During the pulping operation and the subsequent bleaching operation, the cellulose chain lengths are degraded to half or less their original chain length. The pulping and bleaching operations remove the lignins and resins and reduces the pentosan content. The pulping and bleaching operations are very important in dissolving pulp preparation since the dissolving pulp must be of a high purity and have as uniform as possible cellulose chain length. This requires a rigorous pulping and strong bleaching. When wood is used as the fiber source, the degradation of the fiber is not that critical a problem since the initial cellulose chain is in the range of 1800 to 2000. The fiber can undergo fairly severe processing and yet result in a dissolving pulp which can produce a rayon having a degree of polymerization of about 800. However, this is not the case for bagasse since the initial cellulose chain length is in the range of about 800 to 1200. If bagasse fiber is processed in a manner similar to softwood fiber, the pentosan content would not be sufficiently reduced resulting in a rayon of poor quality and poor processability. Such a rayon would not be suitable as a tire cord or for many other prime uses.

However, the predicament is how to get bagasse fiber in a pure condition while minimally attacking and degrading the fibers. This includes reducing the occluded natural silica content of the fibers to essentially zero. That is, the dissolving pulp must be of a high purity, but the chain length must remain above about 800 and preferably about 1000. It is this predicament which has kept bagasse fiber from being used as the fiber source for dissolving pulps, and particularly as the source of fiber for dissolving pulps which are to be converted to rayon having a degree of polymerization of more than 600.

A previously unrecognized problem in converting bagasse to a dissolving pulp is the comparatively high naturally occurring and occluded silica content of the fibers. Bagasse fibers typically contain about 0.5 wt. percent of silica within its fiber structure and up to about 3 wt. percent of contaminating occluded sand and dirt. This sand and dirt contaminates the fibers at the time of harvesting of the cane and gets worked into the fiber bundles primarily during the removal of the sugar syrup. Silica in a finely divided form is a well-known thickening agent. That is, various finely divided silicas, such as silica gels and precipitated silicas, are typically added to liquids to increase their viscosities. However, increased viscosities are deleterious to viscose solutions. It has, therefore, been found to be necessary to decrease as much as possible both the occluded and naturally occurring silica content during the fiber digestion stage. This is accomplished by using a high sodium hydroxide content in the pulping liquor. Sodium hydroxide at high ph's dissolves silica to form sodium silicate, which is soluble in the pulping liquor at ph's above about 8.5. Therefore, it is necessary when pulping bagasse to form a quality dissolving pulp to use a sodium hydroxide to sodium sulfite weight ratio of 1:1 to 1:3 and a high initial ph. This affords effective silica removal from the bagasse fibers while not significantly attacking the fibers.

The present invention is directed to methods for producing a high purity dissolving pulp from bagasse wherein during processing very little cellulose chain length degraaation has occurred. This process consists of a relatively mild sodium hydroxide-sodium sulfite fiber digesting operation (preceded by a prehydrolysis step) followed by a mild DcEDH or DcEDD bleaching operation. A DcEDH dequence is the preferred bleaching sequence. The fiber prehydrolysis operation comprises heating the bagasse fiber at autogenous pressure to a temperature of about 100° C. to 220° C. at a water to fiber ratio of about 1:1 to 15:1. The digestion consists of contacting the prehydrolyzed bagasse fiber with a sodium hydroxide-sodium sulfite solution containing about 4 to 10 weight percent sodium hydroxide and 10 to 18 weight percent sodium sulfite based on the oven dry bagasse fiber content. The weight ratio of sodium hydroxide to sodium bisulfate should be about 1:1 to 1:3. The initial ph of the fiber and sodium hydroxide-sodium sulfite solution should be about 10.5 to 11.5 and preferably about 10.8 to 11.2. Efforts should be taken to maintain this ph throughout at least half the digestion cook time. At the end of the cook the ph should be alkaline, i.e., not neutral or acid. The ph is important since at these sodium hydroxide and sodium sulfite contents, an initial ph of less than about 10.5 yields poor silica (natural and occluded) lignin, resin and pentosan removal from the fibers, while a ph above 11.5 causes excessive fiber attack. When the fiber undergoes excessive fiber attack, it will not produce rayon having a degree of polymerization of greater than about 800, and when there is a high silica content the viscose solution has too high a viscosity to be effectively utilized.

After the fiber is cooked it is washed and then undergoes a DcEDH or DcEDD bleaching procedure. The meaning of these terms are as follows:

Dc chlorine dioxide plus chlorine
E extraction with sodium hydroxide
D chlorine dioxide
H sodium hypochlorite.

The bleachants are used in comparatively mild concentration. Again the aim is to minimize the attack of the cellulose fibers. After the DcEDH or DcEDD bleaching sequence, the fiber is water washed and dried. It is now what is termed a dissolving pulp which is suitable for producing rayon by either the viscose or the cuprammonium process. In almost all instances the viscose process is used for present day rayon production.

The cuprammonium and viscose processes for producing rayon from a dissolving pulp are well-known. A suitable reference in this regard is Rayon, Encyclopedia of Chemical Technology, R. L. Mitchell and G. C. Daul, 2nd Ed., Vol. 17, 1968, Kirk-Othmer, pages 170 through 182. This reference is incorporated herein in regard to those processes for converting a dissolving pulp to rayon.

In more detail it has been found that high quality, high tenacity rayon can be produced from a dissolving pulp derived from bagasse fiber. The gist of the discovery is a method of producing a bagasse dissolving pulp wherein in the processing there has been very little degradation of the bagasse fiber, but yet there is produced a very clear and homogeneous fiber. A prime reason for the homogenity is that due to the fairly constant cellulose chain length of the fiber and minimal attack during processing, there results a dissolving pulp wherein fiber cellulose chain length is very homogeneous.

After the bagasse fiber has been depithed as in U.S. Pat. Nos. 3,537,142 and/or 3,688,345, it is prehydrolyzed by heating in a closed vessel at 100° C. to 220° C. at up to about 100 psig. The water-to-bagasse fiber ratio is 1:1 to 15:1 based on oven-dry fiber. By oven-dry fiber is meant fiber which has been dried in a draft oven at 100° C. The prehydrolysis time is usually in the range of 5 to 90 minutes.

After prehydrolysis the fiber is usually water-washed although this is not necessary. The water content of the vessel is again adjusted to 1:1 to 15:1 and sodium hydroxide and sodium sulfite added. Approximately 4 to 10 wt. percent of sodium hydroxide and 10 to 18 wt. percent sodium sulfite is added in a weight ratio of 1:1 to 1:5 based on the oven-dry content of bagasse. The ph of the bagasse-sodium hydroxide and sodium sulfite mixture is in the range of 10.5 to 11.5, and preferably about 10.8–11.2. This mixture is then heated at 100° C. to 220° C. for from 10 minutes to 3 hours. The average pressure is in the range of 30 psig to 200 psig. Preferably the ph remains above about 10.0 throughout at least the first half (by time) of the cooking, and will at all times be alkaline.

After cooking the fiber is water-washed and bleached using a mild four-step DcEDH or DcEDD procedure. Mild bleachant concentrations and conditions are used throughout this procedure. In essence this procedure consists of the steps of:

Step 1 (Dc)-contacting the digested bagasse fibers with chlorine dioxide and chorine at concentration of 0.5 to 1.5 wt. percent chlorine dioxide and 1 to 4 wt. percent chlorine based on oven-dry fibers;

Step 2 (E)-contacting the bagasse fibers from Step 1 (Dc) with 1 to 4 wt. percent sodium hydroxide based on an oven-dry fiber at a temperature greater than 50° C.;

Step 3 (D)-contacting the bagasse fiber from Step 2 (E) with 0.3 to 1.5 wt. percent chlorine dioxide based on oven-dry fiber at a temperature greater than 50° C.;

Step 4 (H)-contacting the bagasse fiber from Step 3 (D) with sodium hypochlorite having 0.5 to 2.1 wt. percent available $Cl_2$ based on oven-dry fiber.

If a DcEDD sequence is used, the second (D) step uses a chlorine dioxide concentration about half that of the first (D) step and a shorter contact time.

The fiber is water washed between each of the bleaching steps. Preferably the water is at a temperature of above about 30° C.

Slight deviations from this mild DcEDH bleach sequence may be used. The time and temperature for each of these steps is as follows:

Dc—30 to 120 minutes at 20° C. to 40° C.
E—60 to 150 minutes at 50° C. to 100° C.
D—150 to 300 minutes at 50° C. to 100° C.
H—120 to 240 minutes at 30° C. to 80° C.

After bleaching the bagasse fiber should have an Elephro brightness of at least 85. The fiber is washed and dried, and optionally pressed to a matted condition. This fiber is now in a condition to be converted to rayon by either the cuprammonium or the viscose processes. Preferably the viscose process is used.

The bleached fiber which is at a moisture content of 30 wt. percent or less, normally about 10 wt. percent is in the form of pressed sheets or granules. In the first step for converting this material to rayon, the fiber is impregnated with sodium hydroxide to produce an alkali cellulose.

The sodium hydroxide is added in a concentrated condition, usually as about a 40 to 60 weight percent aqueous solution. The fiber up-take of sodium hydroxide is in the range of about 6 to 20 wt. percent. This sodium hydroxide impregnated fiber is usually shredded to deaggregate the fiber and then heated at about 80° C. to 110° C. for about 30 to 120 minutes to completely form the alkali cellulose, also known as sodium cellulose. Optionally, during this time perios the fiber may undergo agitation in order to provide a more deaggregated fiber for viscose formation. The alkali cellulose is then reacted with carbon disulfide to produce the sodium cellulose xanthane.

Carbon disulfide is added in an amount of about 25 to 40 wt. percent of the alkali cellulose content. The forming of sodium cellulose xanthate is then dissolved in a dilute sodium hydroxide solution (6 to 10 wt. percent NaOH). This dissolved fiber also known as viscose is then further converted to fibers by spinning into a sulfuric acid solution usually containing various additives. The various additives impart particular properties such as stretch to the fibers.

The spinning operation consists of forcing the viscose through a spinning die directly into the sulfuric acid solution. The diameter of holes in the die through which the viscose is forced will determine the diameter of the rayon fibers.

The rayon fibers produced from the above described bagasse pulp has a high tenacity and a degree of polymerization of greater than 800. The following examples further amplyfy and describe the present invention.

EXAMPLE 1

Two batches of pulped bagasse fiber were prepared utilizing the conditions of Table 1. The oven dry weight of each batch of bagasse is determined. Sufficient water was then added to the bagasse to produce a water-to-bagasse ratio of 7.3:1. This bagasse-water mixture was increased in temperature to 174° C. over 50 minutes, and maintained at 174° C. for an additional 45 minutes. The pressure was about 115–116 psig. The final ph of the bagasse-water mixture was 3.7.

The prehydrolyzed fiber was water washed and added to 626 lbs. of an aqueous cooking liquor consisting of 5 wt. percent sodium hydroxide and 15 wt. percent sodium sulfite. The cooking liquor-to-bagasse ratio was 7.3:1. The ph of the cooking liquor-bagasse mixture was 11. The digester was sealed and heated by 150° C. by means of indirect steam heating during a 40 minute interval. The digester was then maintained at 150° C. for an additional 60 minutes in Run 1, and 85 minutes in Run 2. The average pressure is 51 psig in Run 1 and 53 psig in Run 2. The ph of the cook liquor remainded above 10.5 during the first half of the cooking period. During the second half of the cooking period, the ph decreased below 10.5 as the sodium hydroxide content was further reduced.

The pulp from each Example was screened using a Bird Model 100 Centrisorter having a 0.062×12% open area screen. The screened acceptable fiber was then washed in a Bauer 606-110 P Centri-Cleaner and wet-lapped on a 31 inch fourdrinier.

TABLE I

| RUN NUMBER | 1 | 2 |
|---|---|---|
| Wet Bagasse Charged, lb | 1015 | 832 |
| % Ovendry | 32.9 | 39.0 |
| Ovendry Bagasse Charged, lb | 334 | 324 |
| Water in Bagasse, lb | 681 | 508 |
| HYDROLYSIS | | |
| Water Added, lb | 1752 | 1857 |
| Water to Bagasse Ratio | 7.3:1 | 7.3:1 |
| Time to Conditions, minutes | 50 | 50 |
| Time at Conditions, minutes | 45 | 45 |
| Hydrolyzate pH | 3.7 | 3.7 |
| Average Temperature, °C. | 174 | 174 |
| Average Pressure, psig. | 115 | 116 |
| COOKING | | |
| Liquor Added, lb | 626 | 626 |
| Water Added, lb | 556 | 520 |
| Liquor to Bagasse Ratio | 7.3:1 | 7.3:1 |
| NaOH Added, % | 5.0 | 5.0 |
| lb | 16.7 | 16.2 |
| $Na_2SO_3$ Added, % | 15.0 | 15.0 |
| lb | 50.1 | 48.6 |
| COOKING TIME | | |
| Time to Conditions, minutes | 40 | 40 |
| Time at Conditions, minutes | 60 | 85 |
| Average Temperature, °C. | 150 | 150 |
| Average Pressure, psig. | 51 | 53 |
| Residual NaOH, g/l | 1.2 | 2.0 |
| lb | 2.9 | 4.9 |
| Residual $Na_2SO_3$, g/l | 7.2 | 8.1 |
| lb | 17.6 | 19.8 |
| Residual pH | 10.0 | 10.1 |
| Washed Yield, Middle, % | 35.2 | 28.7 |
| Bottom, % | 35.9 | — |

EXAMPLE 2

The pulp of Run 1 and Run 2 were combined and bleached using a mild DcEDH bleach sequence. The permanganate number of the pulp ($KMnO_4$ Number) was 13.8. The quantity of bagasse pulp bleached was 190 lbs. (overdry basis). The bleaching sequence and bleaching conditions are set out in Table II.

TABLE II

| BLEACHING DATA | | |
|---|---|---|
| CHLORINATION - $D_C$ | | |
| Chlorine Demand, % | 6.83 | |
| $ClO_2$ Added, % | 1.2 | |
| $ClO_2$, g/l | 10.3 | |
| Time to Add $ClO_2$, minutes | 12 | |
| Time Held, minutes | 5 | |
| Chlorine Added, % | 3.15 | |
| lb | 6.0 | |
| Time to Add Chlorine, minutes | 12 | |
| Time Held, minutes | 50 | |
| Temperature in Chlorinator, °F. | 82 | |
| Consistency in Chlorinator, % | 1.8 | |
| Initial pH | 2.5 | |
| Final pH | 2.1 | |
| Residual $Cl_2$, g/l | 0.0107 | |
| $Cl_2$ Consumed, % | 99.0 | |
| EXTRACTION - E | | |
| NaOH Added, % | 3.0 | |
| NaOH, g/l | 19.6 | |
| Time to Add NaOH, minutes | 55 | |
| Time Held, minutes | 90 | |
| Consistency off Washer, % | 4.72 | |
| Temperature, °F. | 174 | |
| Initial pH | 11.3 | |
| Final pH | 11.1 | |
| $ClO_2$ - D | | |
| $ClO_2$ Added, % | | 1.2 |
| g/l | | 10.3 |
| NaOH Added, % | | 0.5 |
| g/l | | 19.6 |
| Time to Add $ClO_2$, minutes | | 50 |
| Time Held, minutes | | 240 |
| Consistency off Washer, % | | 4.71 |
| Temperature, °F. | | 180 |
| Initial pH | | 5.5 |
| Final pH | | 5.0 |
| $ClO_2$ Consumed, % | | 81.2 |
| HYPOCHLORITE - H | | |
| $Cl_2$ Added, % | | 0.8 |
| g/l | | 20.9 |
| NaOH for pH Control, % | | 0.5 |
| g/l | | 19.6 |
| Time to Add $Cl_2$, minutes | | 50 |
| Time Held, minutes | | 180 |
| Consistency off Washer, % | | 4.35 |
| Temperature, °F. | | 138 |
| Initial pH | | 10.5 |
| Final pH | | 10.0 |
| Chlorine Consumed, % | | 59.3 |
| Brightness - Elrepho - (After Dry-Lapped) | | 87.0 |

The pulp from Runs 1 and of Example 1 were dispersed in a Hi-Lo Pulper and raised to a temperature of 100° F. prior to transfer to the chlorinator.

The chlorination stage was conducted by adding chlorine dioxide solution to the chlorinator. After a retention time of five minutes, chlorine gas was added. Stock was pumped from the top of the chlorinator and discharged tangentially into the bottom. A cone is located in the bottom center to assist in mixing. The chlorinator is constructed of glazed title, pointed at the joints with polyester cement.

On completion of the chlorination stage, the pulp was processed over a Kamyr Washer. Three hot-water showers washed the pulp as it passed over the surface of the washer. Water temperature was maintained at 120°–130° F. for all washing stages.

The pulp from the chlorinator was discharged into a high-density tower, ten feet high and thirty inches in diameter. The pulp was retained in this tower without agitation during the EDH bleaching operations. The temperature was maintained in the tower with steam coils. The condition in the tower was as set out in Table II. At the end of the H bleaching operation the pulp was discharged from the tower through an eductor using fresh water as motive power.

The bleached pulp was processed through the Bauer No. 606-110P Centrifugal Cleaner and adjusted to ph 5.0 with $SO_2$ prior to cleaning. After cleaning the water content is reduced to less than about 30 wt percent by compressing, heating, or a combination of these techniques. The bleached bagasse fiber had the properties of Table III.

TABLE III

BAGASSE CHARACTERISTICS

| SAMPLE | Unbleached Pulp of Runs 1 & 2 | Bleached Pulp |
|---|---|---|
| Pentosans, % | 4.6 | 2.6 |
| Ash, % | 0.68 | 0.39 |
| Alpha-Cellulose, % Corrected for Pentosans and Ash | 89.1 | 89.7 |
| Viscosity 0.5% Cu(En)$_2$ at 25° C. cp. | 39.5 | 8.8 |

EXAMPLE III

The bleached bagasse fiber from Example 2, which is in the form of dry paperboard (<5% water content) was placed in a press and impregnated with sodium hydroxide using a 50 percent (by wt.) sodium hydroxide solution. The paper board sheets were placed in the press, the sodium hydroxide solution placed above the paper board sheets and forced down through the sheets by means of a piston. The temperature of the sodium hydroxide was about 50° C.

The sheets contain about 8 wt. percent sodium hydroxide and are shredded and the shredded fiber then heated in a closed reactor at 100° C. for 60 minutes to form the sodium cellulose (alkali cellulose). The fiber was then cooled and maintained at 25° C. to 35° C. and reacted with carbon disulfide. Carbon disulfide was added in a content of 30 wt. percent of the alkali cellulose content. The resulting viscose solution was dissolved in a dilute sodium hydroxide solution, filtered and spun into rayon fibers using a sulfuric acid bath solution. The fibers exhibitied the properties of:

TABLE IV

| SAMPLE | DENIER | TENACITY | % BREAK EXTENSION |
|---|---|---|---|
| Commercial Rayon | 1.49 | 4.06 | 6.14 |
| Bagasse Derived Rayon | 1.31 | 4.41 | 9.72 |
| WET TEST | | | |
| Commercial Rayon | 1.45 | 2.83 | 9.50 |
| Bagasse Derived Rayon | 1.47 | 2.27 | 14.67 |

The bagasse derived rayon had a degree of polymerization of about 900.

EXAMPLE IV

This example illustrates the use of a pulping liquor having a $NaOH/Na_2SO_3$ weight ratio of 1:2. The ratio in the runs of Example I is 1:3.

The bagasse fiber yield from the depither was 64.6 wt.%. The fiber at a 27 wt.% moisture content was fed to a rotary digester for prehydrolysis and digestion. The prehydrolysis conditions were:
(1) water to fiber ratio—4.0:1
(2) temperature—174° C.
(3) time to temperature—50 minutes
(4) time at temperature—45 minutes
(5) yield—76.9% M.F.

After prehydrolysis the fiber was removed from the digester, washed with 45° C. water and adjusted to ph of 8.5 with $NH_4OH$. This fiber is then pressed to a 27% moisture content and returned to the digester. The digestion parameters are as follows:
(1) Liquor
 (a) $NaOH/Na_2SO_3$—1:2
 (b) $Na_2SO_3$ on fiber—10%
 (c) NaOH on fiber—5%
 (d) total liquid on fiber—4:1
(2) Conditions
 (a) digestion temperature—170° C.
 (b) time to temperature—5 minutes
 (c) cooking time—60 minutes After cooking the bagasse was removed from the digester and washed with 45° C. water at ph 7. The digestion yield was 56.1wt% based prehydrolysis fiber. The fiber had a $KMnO_4$ number of 22.0, a brightness of Elrepho 23.2 and a chlorine demand of 11.9%. This fiber was then bleached according to the parameters of Table V.

TABLE V

| | |
|---|---|
| Chlorination (Dc) | |
| $ClO_2$, % Added on m.f. pulp | 1.2% |
| Retention Time, minutes | 9 |
| $Cl_2$ added, % | 3.0 |
| Total Retention Time, minutes | 65 |
| Consistency, % | 2 |
| Temperature, °C. | 23 |
| Chlorine Consumes, % | 100 |
| Final pH | 2.1 |
| Extraction (E) | |
| Surfactant % b.d. pulp | 0.25 |
| Added NaOH, % based on m.f. pulp | 3.0 |
| Surfactant on m.f. pulp % | 0.25 |
| Retention Time, minutes | 90 |
| Temperature °C. | 82.0 |
| Stock consistency, % | 10 |
| Initial pH | 11.5 |
| End pH | 10.5 |
| NaOH consumed, % | 48.0 |
| Chlorine Dioxide-(D) | |
| $ClO_2$ Added, % | 1.2 |
| NaOH Buffer, based on m.f. pulp, % | 0.5 |
| Stock Consistency, % | 10 |
| Temperature, °C. | 82 |
| Retention Time, minutes | 240 |
| Final pH | 2.2 |
| Initial pH - pulp with NaOH (Buffer) | 11.0 |
| Residual - g/l $ClO_2$ | 0.05 |
| $ClO_2$ Consumed, % | 96.0 |
| Chlorine Dioxide-D | |
| $ClO_2$ Added, % | 0.6 |
| NaOH Buffer, based on m.f. pulp, % | 0.2 |
| Stock Consistency, % | 10 |
| Temperature, °C. | 82 |
| Retention Time, minutes | 180 |
| Final pH | 3.6 |
| Initial pH - Pulp with NaOH Buffer | 9.6 |

TABLE V-continued

| Residual - g/l ClO$_2$ | 0.11 |
| CIO$_2$ Consumed, % | 82 |

The resulting bleached fiber after washing had the following properties:
Brightness—88.2 Elrepho
Hemicellulose, wt.%—3.8
Alpha cellulose, % on hemicellulose and ash free pulp—94.7
Silica, wt.%—0.11
Ash, wt.%—0.54%
Viscosity, 0.5% Cu(EN)$_2$ @25° C. cp.—19.0

This dissolving pulp produced rayon having properties similar to the bagasse rayons of Example III. However, due to a lower silica content due to the higher sodium hydroxide ratio the viscosity of the viscose was lower which resulted in better rayon conversion properties.

What is claimed is:

1. A method for preparing a bagasse dissolving pulp suitable for producing a rayon having a degree of polymerization of at least 800 comprising:
   (a) prehydrolyzing said bagasse fiber with water at autogenous pressure and at a temperature of about 100° C. to 220° C. for about 5 to 90 minutes, the water to bagasse fiber being 1:1 to 15:1;
   (b) digesting the prehydrolyzed bagasse fiber and leaching the silica content therefrom with an alkaline liquor containing about 4 to 10 weight percent sodium hydroxide and about 10 to 18 weight percent sodium sulfite based on oven-dry bagasse fiber, the ratio by weight of sodium hydroxide to sodium sulfite being about 1:1 to 1:3 the pH of the prehydrolyzed bagasse fiber-alkaline liquor mixture being 10.5 to 11.5 and maintaining the pH of the digestion mixture within said pH range throughout at least the first half of the digestion time;
   (c) bleaching the digested bagasse fibers substantially free of silica using a four-step DcEDH process wherein the fourth H step may be replaced with a second D step wherein said four-step process comprises:
   (Dc)-contacting the digested bagasse fibers with chlorine dioxide and chlorine at concentration of 0.5 to 1.5 weight percent chlorine dioxide and 2 to 4 weight percent chlorine based on oven-dry fiber;
   (E)-contacting the bagasse fibers from step (Dc) with 2 to 4 weight percent sodium hydroxide based on an oven-dry fiber at a temperature greater than 50° C.
   (D)-contacting the bagasse fiber from step (E) with 0.5 to 1.5 weight percent chloride dioxide based on oven-dry fiber at a temperature greater than 50° C.;
   (H)-contacting the bagasse fiber from step (D) with sodium hypochlorite having 0.5 to 1.0 weight percent available Cl$_2$ based on oven-dry fiber; and
   (d) recovering a bagasse dissolving pulp.

2. A method for preparing a bagasse dissolving pulp as in claim 1, wherein said alkaline liquor contains about 8 weight percent sodium hydroxide and about 12 weight percent sodium sulfite and said prehydrolyzed bagasse-alkaline liquor mixture having a ph of 10.8 to 11.2.

3. A method of preparing a dissolving pulp as in claim 2, wherein the Elrepho Brightness of the fiber after step (H) is greater than 85.

4. A method for preparing a bagasse dissolving pulp as in claim 1, wherein said alkaline liquor contains about 5 weight percent sodium hydroxide and about 15 weight percent sodium sulfite and said prehydrolyzed bagasse-alkaline liquor mixture having a ph of 10.8 to 11.

5. A method for preparing a bagasse dissolving pulp as in claim 1, wherein said dissolving pulp is recovered by washing with water and drying to a moisture content of less than about 10 weight percent.

6. A method for preparing a bagasse dissolving pulp as in claim 1, wherein said dissolving pulp is recovered by washing with water and drying to a moisture content of less than about 10 weight percent.

7. A method for preparing a bagasse dissolving pulp as in claim 1, wherein the fourth (H) step is replaced with a (D) step wherein the bagasse fiber from the third step (D) is contacted with 0.25 to 0.1 weight chlorine dioxide based on oven-dry fiber at a temperature greater than 50° C.

* * * * *